UNITED STATES PATENT OFFICE.

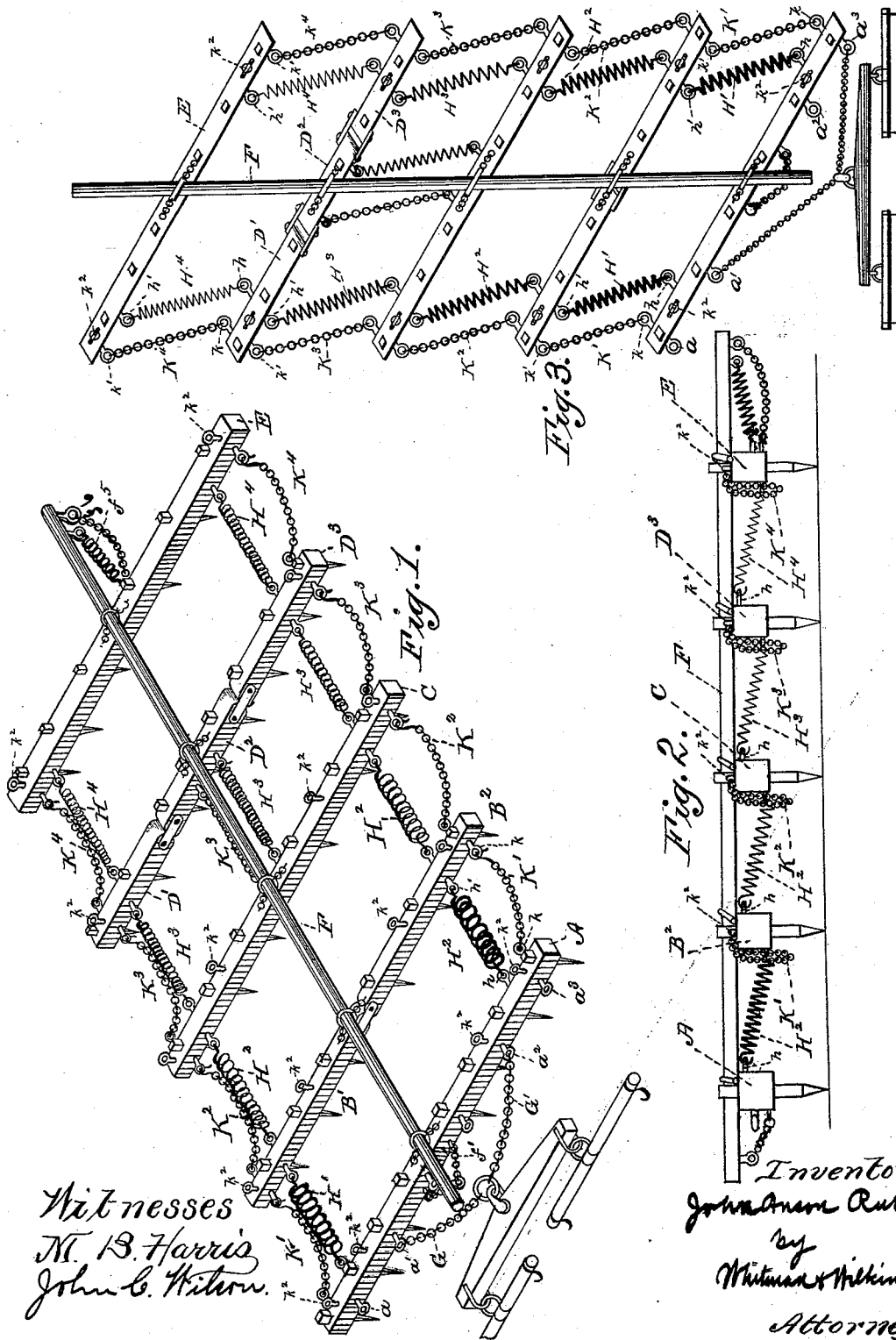

JOHN ANSON RUBE, OF BEEBE, ARKANSAS.

HARROW.

SPECIFICATION forming part of Letters Patent No. 457,218, dated August 4, 1891.

Application filed October 7, 1890. Serial No. 367,326. (No model.)

*To all whom it may concern:*

Be it known that I, JOHN ANSON RUBE, a citizen of the United States, residing at Beebe, in the county of White and State of Arkansas, have invented certain new and useful Improvements in Harrows; and I do hereby declare the following to be a full, clear, and exact description of the invention, such as will enable others skilled in the art to which it appertains to make and use the same.

My invention relates to certain improvements in harrows whereby the danger of breaking or bending the teeth from striking rocks, stumps, or roots is obviated and the necessity of having different widths of harrows and different teeth and weights for different grades of work is done away with. In addition to these I have made certain other improvements which will be best understood by reference to the accompanying drawings, wherein the same parts are indicated by the same letters.

Figure 1 is a perspective view of my improved harrow. Fig. 2 is a side elevation of the same with the chains unhooked. Fig. 3 is a plan view of my harrow when making a narrow sweep.

My improved harrow is made of a number of parallel cross-pieces carrying the teeth, some of which cross-pieces are sectional and some continuous. In the drawings I have shown five such cross-pieces; but the number of them is immaterial, and any convenient number may be used. When using five such cross-pieces, I preferably have the first A, third C, and fifth E solid beams, while the second is preferably made of two separate beams $B'$ and $B^2$, coupled together by a bolt and clevis or in any other convenient way, and the fourth cross-piece is preferably made in three sections $D'$, $D^2$, and $D^3$, similarly coupled. The teeth in the various cross-pieces are so arranged that no two are directly in line in the direction in which the harrow is drawn. I preferably use steel teeth, although teeth of wrought-iron, hard wood, or any other convenient material may be used. A is drawn directly by the team. $B'$ and $B^2$ are connected to A by the taut stout spiral springs $H'$ and $H'$ and the slack chains $K'$ $K'$. C is connected to $B'$ and $B^2$ by the taut stout spiral springs $H^2$ and $H^2$ and the slack chains $K^2$ $K^2$. In a similar way the three sections $D'$, $D^2$, and $D^3$ are connected by three springs and chains, while the outer sections $D'$ and $D^3$ drag the two ends of E by the springs $H^4$ $H^4$ and relief-chains $K^4$ $K^4$.

The various sections of the harrow, except the front section, (which is drawn directly by the team,) are ordinarily drawn by springs, the chains being to prevent injury to the springs from overstraining and at the same time to do any specially heavy work that may be required. The springs give the teeth a quivering or dancing motion, which materially helps to break the clods up.

For light work the chains may be unhooked entirely, leaving the various sections to be drawn by the springs alone, while, again, in heavy work the springs may be unhooked, leaving the chains to do the work alone. In order that either some or all of these may be temporarily unhooked without the necessity of removing them from the harrow, I have one end of each shackled to eyebolts $h$ and $k$, respectively, and the other end provided with hooks engaging in rings $h'$ and $k'$, respectively. I also provide eyebolts $k^2$ on top of the various cross-beams to hook the said ends of the chains or springs in when not in use.

It will readily be seen that the heaviest strain comes on the front cross-piece, and that this strain decreases in each succeeding cross-piece. To get the desired tremulous effect from the springs, therefore, it is advisable to make them of gradually decreasing strength for the rear sections, each spring being weaker than the springs in front of it and stronger than those behind. The chains might be of similarly graded strength; but this is not so important. Since the strain from the team is on the upper part of the harrow-teeth in a forward direction, and that from the ground on the points of the teeth is in a backward direction, there is a strong tendency for the beams to topple over forward, throwing the teeth out of the ground to the rear. To partially obviate this I have the springs and chains lead from eyebolts or rings near the top of the preceding cross-piece to eyebolts or rings near the bottom of the following cross-piece. The latter eyebolts then act as the fulcrum for two systems of levers, the one being the teeth of the harrow pressed against by the earth and tending to throw the teeth out backward and the other being the drag of the after sections acting through a lever-arm equal to the depth or any desired part of the depth of the cross-beam and tending to throw the teeth in the opposite direction. Sometimes one of these forces will be greater, at others the other, and the rapid changes between the two will also add to the quivering of my harrow, tending to shatter the clods. Another great advantage of this yielding of the teeth to any great strain is that if a rock, stump, or other unyielding obstruction is struck the teeth will turn back and slide over it without bending or breaking, as with the harrows now in ordinary use. For the same reason my harrow will automatically clear itself of grass, weeds, or other matter tending to clog the motion of the teeth in the ground. It will be noted that the rear section has no backward drag from the other sections, and consequently must be otherwise provided for against toppling over. To manage this, I may have outriggers weighted at their ends leading back of the harrow and rigidly secured to the top of the last section, whereby its center of gravity will tend to cause it to topple over in the opposite direction; but I prefer to provide for this section with a ridge-pole F, shackled to the forward section with a chain $f'$ and secured to the upper rear part of the last sections with either a stout spring $f^5$ or a chain $f^6$, or both, which hooking under tension gives the desired backward drag to the upper part of the said rear cross-piece, and at the same time the ridge-pole also acts as a strut to keep all the springs in a state of tension, and also to keep the chains taut and the teeth upright when the springs are unhooked. When it is desired to harrow light, by unhooking the rear end of the ridge-pole the harrow-teeth will turn backward somewhat and skim along the ground with a quivering motion.

Another important function of the ridge-pole is that by having chain-bridles on the centers of each cross-piece with rings in the centers of the bridles inclosing and sliding along the ridge-pole the several cross pieces are kept from too great a lateral play.

My object in having some of the cross-pieces whole and some in sections is that these sections being made flexible will conform to uneven surfaces, and will harrow where long stiff sections would fail to work well.

Another feature of my invention is that I have provided in front of the first cross-piece a number of eyebolts $a$ $a'$ $a^2$ $a^3$, &c., into which I can secure the two chains G and G', forming the bridle by which the harrow is drawn. By hooking G and G', shortening either one or both, if it be desired, to two eyebolts on either side of the central point of the cross-piece, but not the same distance from the center, the harrow will become lozenge-shaped, as shown in Fig. 3, and will cover a narrower path than when the cross-pieces are at right angles to this path. The width of the path may be regulated at will by hooking the ends of the bridle eccentrically and shortening up one chain, lengthening the other, or by doing both. This feature renders my harrow very convenient for use between the rows of any growing crop. Handles or other guides may be applied to the rear section if it be so desired.

Having now described my invention, what I claim, and desire to secure by Letters Patent, is—

1. In a harrow, the combination of a number of parallel cross-pieces carrying the teeth with a chain-bridle connecting the first cross-piece to the team, and taut stout springs and slack chains connecting each cross-piece to the one immediately in the rear thereof, substantially as described.

2. In a harrow, the combination of a number of parallel cross-pieces carrying the teeth with a chain-bridle connecting the first cross-piece to the team, and taut stout springs, said springs decreasing in strength from the front to the rear sections of the harrow, and slack chains connecting each cross-piece to the one immediately in the rear thereof, substantially as described.

3. In a harrow, the combination of a number of parallel cross-pieces carrying the teeth with a chain-bridle connecting the first cross-piece to the team, and taut stout springs and slack chains, said chains and springs being secured near the top of the leading cross-piece and near the bottom of the following cross-piece and connecting each cross-piece to the one immediately in the rear thereof, substantially as described.

4. In a harrow, the combination of a number of parallel cross-pieces carrying the teeth with a chain-bridle connecting the first cross-piece to the team, and taut stout springs and slack chains, said chains and springs being secured near the top of the leading cross-piece and near the bottom of the following cross-piece and having hooks at one end of each chain and spring, with eyebolts for the said hooks near the top of the preceding cross-piece or the bottom of the following cross-piece for holding the same when in use, and also eyebolts on top of the said cross-pieces for holding the said ends of the springs or chains when not in use, the said springs and chains connecting each cross-piece to the one immediately in the rear thereof, substantially as described.

5. In a harrow, the combination of a number of parallel cross-pieces carrying the teeth with a chain-bridle connecting the first cross-piece to the team, and stout springs connecting each cross-piece to the one immediately in the rear thereof, and a ridge-pole shackled at its forward end to the forward cross-piece with a chain and sliding through rings on bridles on the middle cross-pieces and having an adjustable hook and chain shackling the rear upper edge of the rear cross-piece to the rear end of the said ridge-pole, substantially as described.

6. In a harrow, the combination of a number of parallel cross-pieces carrying the teeth with a chain-bridle connecting the first cross-piece to the team, and taut stout springs and slack chains connecting each cross-piece to the one immediately in the rear thereof, and a ridge-pole shackled at its forward end to the forward cross-piece with a chain and sliding through rings on bridles on the middle cross-pieces, having an adjustable hook and chain shackling the rear upper edge of the rear cross-piece to the rear end of the said ridge-pole, substantially as described.

7. In a harrow, the combination of a number of parallel cross-pieces carrying the teeth with a chain-bridle connecting the first cross-piece to the team, and taut stout springs, said springs decreasing in strength from the front to the rear sections of the harrow, and slack chains connecting each cross-piece to the one immediately in the rear thereof, and a ridge-pole shackled at its forward end to the forward cross-piece with a chain and sliding through rings on bridles on the middle of the cross-pieces, said ridge-pole having an adjustable hook and chain shackling the rear upper edge of the rear cross-piece to the rear end of the said ridge-pole, substantially as described.

8. In a harrow, the combination of a number of parallel cross-pieces carrying the teeth with a chain-bridle connecting the first cross-piece to the team, and taut stout springs and slack chains, said chains and springs being secured near the top of the leading cross-piece and near the bottom of the following cross-piece and connecting each cross-piece to the one immediately in the rear thereof, and a ridge-pole shackled at its forward end to the forward cross-piece with a chain and sliding through rings on bridles on the middle cross-pieces, having an adjustable hook and chain shackling the rear upper edge of the said ridge-pole, substantially as described.

9. In a harrow, the combination of a number of parallel cross-pieces carrying the teeth with a chain-bridle connecting the first cross-piece to the team, and taut stout springs and slack chains, said chains and springs being secured near the top of the leading cross-piece and near the bottom of the following cross-piece and having hooks at one end of each chain and spring, with eyebolts for the said hooks near the top of the preceding cross-piece or the bottom of the following cross-piece for holding the same in use, and also eyebolts on top of the said cross-pieces for holding the said ends of the springs or chains when not in use, the said springs and chains connecting each cross-piece to the one immediately in the rear thereof, and a ridge-pole shackled at its forward end to the forward cross-piece with a chain and sliding through rings on bridles on the middle cross-pieces, having an adjustable hook and chain shackling the rear upper edge of the rear cross-piece to the rear end of the ridge-pole, substantially as described.

10. In a harrow, the combination of a plurality of parallel sections secured together by pliable connections with an adjustable chain-bridle for drawing the same, and a plurality of eyebolts in the said front sections, whereby the said chain-bridle may be secured eccentrically, substantially as described.

11. In a harrow, the combination of a number of parallel cross-pieces carrying the teeth with a chain-bridle connecting the first cross-piece to the team, and stout springs connecting each cross-piece to the one immediately in the rear thereof, said cross-pieces being composed in part of whole beams and in part of shorter beams coupled together endwise, substantially as described.

12. In a harrow, the combination of a number of parallel cross-pieces carrying the teeth with a chain-bridle connecting the first cross-piece to the team, and taut stout springs, said springs decreasing in strength from the front to the rear sections of the harrow, and slack chains connecting each cross-piece to the one immediately in the rear thereof, said cross-pieces being composed in part of whole beams and in part of shorter beams coupled together endwise, substantially as described.

13. In a harrow, the combination of a number of parallel cross-pieces carrying the teeth, said cross-pieces being composed in part of whole beams and in part of shorter beams coupled together endwise, with an adjustable chain-bridle connecting the first cross-piece to the team, a plurality of eyebolts in the said front section, and taut stout springs and slack chains connecting each cross-piece to the one immediately in the rear thereof, and a ridge-pole shackled at its forward end to the forward cross-piece with a chain and sliding through rings on bridles on the middle of the cross-pieces, having an adjustable hook and chain shackling the rear upper edge of the rear cross-piece to the rear end of the said ridge-pole, substantially as described.

14. In a harrow, the combination of a number of parallel cross-pieces carrying the teeth, said cross-pieces being composed in part of whole beams and in part of shorter beams coupled together endwise, with an adjustable chain-bridle connecting the first cross-piece to the team, a plurality of eyebolts in the said front section, and taut stout springs and slack chains, said chains and springs being secured near the top of the leading cross-piece and near the bottom of the following cross-piece and having hooks at one end of each chain and spring, with eyebolts for the said hooks near the top of the preceding cross-piece or the bottom of the following cross-piece for holding the same when in use, and also eyebolts on top of the said cross-pieces for holding the said ends of the springs or chains when not in use, the said springs and chains connecting each cross-piece to the one immediately in the rear thereof, and a ridge-pole shackled at its forward end to the forward cross-piece with a chain and sliding through rings on bridles on the middle of the cross-pieces, having an adjustable hook and chain shackling the rear upper edge of the rear cross-piece to the rear end of the ridge-pole, substantially as described.

15. In a harrow, the combination, with a chain-bridle connecting the first cross-piece to the team and having a plurality of eyebolts therefor, of five parallel cross-pieces carrying the teeth, the first, third, and fifth cross-pieces being one continuous beam, the second cross-piece being of two sections coupled together lengthwise and having free play in all directions around the said coupling, and the fourth cross-piece having three such sections, said cross-pieces and sections thereof being secured to those that precede and to those that follow with taut springs and slack chains, said chains and springs being secured near the top of the leading cross-piece and near the bottom of the following cross-piece and having hooks at one end of each chain and spring, with eyebolts for the said hooks near the top of the preceding cross-piece or the bottom of the following cross-piece for holding the same when in use, and also eyebolts on top of the said cross-pieces for holding the said ends of the springs or chains when not in use, the said springs and chains connecting each cross-piece to the one immediately in the rear thereof, and a ridge-pole shackled at its forward end to the forward cross-piece with a chain and sliding through rings on the middle of the cross-pieces, having an adjustable hook and chain shackling the rear upper edge of the rear cross-piece to the rear end of the ridge-pole, substantially as described.

In testimony whereof I affix my signature in presence of two witnesses.

JOHN ANSON RUBE.

Witnesses:
L. H. KRUMP,
J. E. RUSS.